Patented Mar. 3, 1942

2,275,384

UNITED STATES PATENT OFFICE 2,275,384

BUTYL ESTERS OF 4-METHYL-Δ4-TETRAHYDROPHTHALIC ACID

Frank J. Soday, Upper Darby, Pa., assignor to The United Gas Improvement Company, a corporation of Pennsylvania No Drawing. Application December 21, 1938, Serial No. 246,997

14 Claims. (Cl. 106—181)

The present invention relates to new compositions of matter and to methods for their preparation.

More particularly, this invention pertains to butyl esters of 4-methyl-Δ4-tetrahydrophthalic acid and its anhydride, and processes for the preparation of these new esters.

This invention is based upon the discovery that esters possessing very valuable properties can be obtained by the reaction of butyl alcohols with 4-methyl-Δ4-tetrahydrophthalic acid, its anhydride, or mixtures containing the acid and anhydride.

4-methyl-Δ4-tetrahydrophthalic acid is an isoprene derivative having the following general formula:

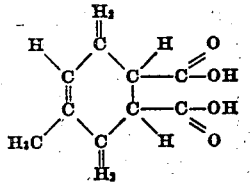

Its anhydride, 4-methyl-Δ4-tetrahydrophthalic anhydride, having the following structural formula,

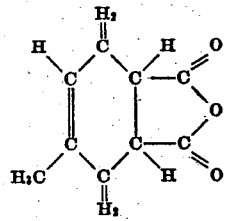

is the equivalent of the acid in the preparation of the esters disclosed herein.

It is an object of the present invention to provide as new compositions of matter, butyl esters of 4-methyl-Δ4-tetrahydrophthalic acid and processes for their preparation and purification. More specifically, it is an object of the invention to provide new organic compounds comprising fluids which are essentially colorless and odorless and which are suitable for use alone or in combination with other substances as plasticizers in the formulation of lacquers, particularly these lacquers containing cellulose esters. Still another object is the provision of new compounds particularly valuable as plasticizers for synthetic and natural resins and plastics in general. A still further object of the invention is to provide new compounds which may be used as chemical intermediates in chemical synthesis. Another object is the provision of a process for effecting reactions between 4-methyl-Δ4-tetrahydrophthalic acid, its anhydrides and/or its derivatives with primary, secondary and tertiary butyl alcohols, mixtures and derivatives of these alcohols. Other objects and advantages of the invention will be apparent to those skilled in the art from the following description.

4-methyl-Δ4-tetrahydrophthalic acid or its anhydride may be obtained in a number of ways. For example, the anhydride may be prepared through the reaction of isoprene with maleic anhydride. This reaction may be illustrated structurally as follows:

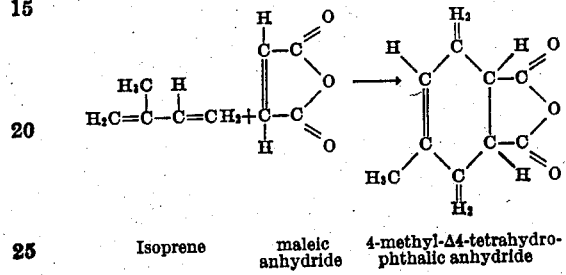

Isoprene    maleic anhydride    4-methyl-Δ4-tetrahydrophthalic anhydride

The anhydride may be readily hydrolyzed to form the corresponding acid, 4-methyl-Δ4-tetrahydrophthalic acid, for instance, by mixture with water.

Illustrative of the reaction by which 4-methyl-Δ4-tetrahydrophthalic anhydride may be prepared is the example given below as Example 1.

Isoprene, or hydrocarbon fractions containing any portion of isoprene may be used to react with maleic anhydride. The isoprene may be obtained synthetically, by the pyrolysis of rubber, or from fractions obtained by condensation in the manufacture of carburetted water gas, oil gas, refinery gas, or coke oven gas, or from similar sources. Such fractions will be referred to herein generally as light oil fractions.

For example, a sample of light oil obtained in the manufacture of oil gas under certain conditions, may be fractionated to obtain a cut containing say from 30 to 90% isoprene, in addition to various quantities of other unsaturated hydrocarbons. Cyclopentadiene and perhaps similar unsaturated hydrocarbons which may be present in an isoprene fraction may, if desired, be removed among other ways by heating the material, say at 100° C., in a closed vessel for several hours, followed by the distillation of the unchanged isoprene from the polymers thus formed. Piperylene may also be present. While a concentration of isoprene of at least 30% is preferred, lower concentrations may be employed.

The isoprene or isoprene fraction may be reacted with maleic anhydride or maleic acid or mixtures of these to produce 4-methyl-Δ4-tetrahydrophthalic anhydride by warming a mixture of the reagents. The reactants may be mixed say in substantially molar quantities and allowed to react at room temperatures or at elevated temperatures until substantially complete conversion has been obtained.

A preferred embodiment of effecting the reaction is to mix the reactants and allow the mixture to stand at room temperature for a period of time, followed by heating to a temperature of approximately 60° C. for a relatively short period of time.

However, the process is not restricted to the use of any definite heating time or temperature.

The reactants may be combined as such, or in solution form in a suitable solvent or solvents. Suitable solvents for this purpose include aromatic hydrocarbons, chlorinated solvents, esters, ethers, and the like.

4-methyl-Δ4-tetrahydrophthalic anhydride is obtained in good yields as a result of this reaction. The anhydride may be readily hydrolyzed to 4-methyl-Δ4-tetrahydrophthalic acid if desired as above pointed out.

Illustrative of one of the methods of preparation of 4-methyl-Δ4-tetrahydrophthalic anhydride is the following example:

Example 1

A portion of an isoprene cut obtained by the fractionation of light oil, and containing 90 parts by weight of isoprene was mixed with 100 parts of maleic anhydride. This mixture was then dissolved in 260 parts of benzene, placed in an autoclave and allowed to stand for approximately 45 hours at room temperature. It was then heated to 60° C. for a period of 6 hours with agitation. At the end of this period it was cooled to 0° C. and filtered. There was obtained a mass of crystals corresponding to approximately 105 parts by weight. A further quantity of crystals, amounting to approximately 45 parts by weight was obtained by recrystallization from the filtrate. These crystals, totalling approximately 150 parts by weight, were found to be a highly purified form of 4-methyl-Δ4-tetrahydrophthalic anhydride.

Ester formation

Through the reaction of 4-methyl-Δ4-tetrahydrophthalic acid or its anhydride with butyl alcohols, there may be produced butyl esters of the acid having properties which make such esters valuable in a number of industrial fields.

Among the butyl alcohols which may be reacted with 4-methyl-Δ4-tetrahydrophthalic acid or its anhydride are the following: normal butyl alcohol, isobutyl alcohol, secondary butyl alcohol, tertiary butyl alcohol, and mixtures of alcohols containing one or more of the butyl alcohols.

The esters obtained through such reactions theoretically have the following structural formulae:

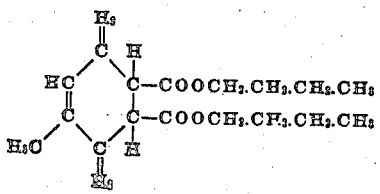

Normal butyl ester of 4-methyl-Δ4-tetrahydrophthalic acid.

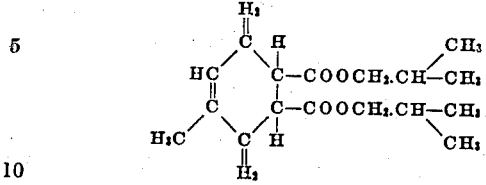

Isobutyl ester of 4-methyl-Δ4-tetrahydrophthalic acid.

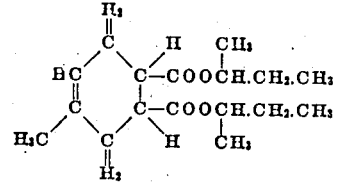

Secondary butyl ester of 4-methyl-Δ4-tetrahydrophthalic acid.

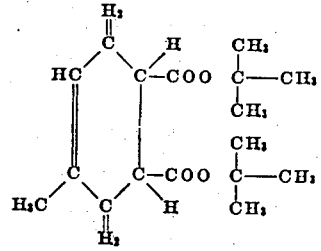

Tertiary butyl ester of 4-methyl-Δ4-tetrahydrophthalic acid.

The butyl esters of 4-methyl-Δ4-tetrahydrophthalic acid are practically colorless and odorless fluids.

They may be used as plasticizers for cellulose acetate, cellulose nitrate, natural gums, synthetic resins, and resinous and plastic materials in general.

They may be applied in combination with other plasticizers in the formulation of plastics including lacquers, particularly those lacquers containing cellulose esters. They are particularly valuable as plasticizers for lacquer films. They may be used as plasticizers and softening agents for resins, plastics, and gums which are to be molded, extruded, cast, or formed by any of the methods known to the art. They also are valuable as intermediates in chemical syntheses.

Exemplary of their industrial utility is their use in the preparation of lacquer plasticizers. For this purpose, it is sometimes desirable to employ substances possessing a fairly wide range in plasticizing characteristics. Mixed butyl esters of 4-methyl-Δ4-tetrahydrophthalic acid such as are obtained by the reaction of mixtures containing butyl alcohols with the acid or its anhydride, are particularly adapted to meet the requirements for such lacquer plasticizers.

On the other hand, it is often desirable to make use of substances having a fairly narrow boiling range. Butyl esters of 4-methyl-Δ4-tetrahydrophthalic acid or its anhydride, which have been prepared through the reaction of a single butyl alcohol with the acid or anhydride, meet the requirements for such a substance.

For certain uses, such as for lacquer plasticizing agents, it has been found advantageous in certain cases to use a mixture of the ester with a small quantity of the corresponding alcohol in order to neutralize any acidity which may be formed as the result of a slight hydrolysis of the ester.

The butyl esters of 4-methyl-Δ4-tetrahydrophthalic acid may be made in different ways.

One convenient way for the preparation of such esters is to react 4-methyl-Δ4-tetrahydrophthalic acid or its anhydride with the desired butyl alcohol by heating the reacting constituents to the boiling point of the alcohol while employing a reflux condenser to return the vaporized alcohol to the still.

The reaction of butyl alcohol and 4-methyl-Δ4-tetrahydrophthalic acid or anhydride results in the production of water and it is advisable to remove the water from the reaction.

This may be done in a number of ways.

For example, the mixed reactants may be heated to boiling, the vapors condensed, and the condensate permitted to stratify. The alcohol layer may be returned to the still and the water layer discarded or further processed to reclaim the small quantities of alcohol and esters which it may contain.

The continuous removal of the water formed during the reaction results in a considerable increase in the velocity of the esterification reaction and an increase in the yield of esters obtained from the process.

The removal of water formed during the reaction may be facilitated by the addition of a third component. A procedure which has been found very satisfactory is the following: benzene is added to the mixture of the butyl alcohol and 4-methyl-Δ4-tetrahydrophthalic acid or its anhydride, and the ternary system so formed is heated to boiling. The vapors formed are condensed and permitted to stratify. The benzol-alcohol layer, namely, the upper layer, is returned to the still and the water layer is discarded, or subsequently processed to reclaim the small quantities of alcohol and ester which it may contain. This procedure may be employed in batch or continuous operations, or otherwise.

Another way to prepare the butyl esters of 4-methyl-Δ4-tetrahydrophthalic acid involves the use of a catalyst which will facilitate the splitting off of water between the alcohol and the acid. Among the catalysts which may be employed, are sulfuric acid and anhydrous hydrogen chloride. When the latter is used, the mixture of alcohol and acid may be saturated with the dry hydrogen chloride, if desired.

The butyl esters of 4-methyl-Δ4-tetrahydrophthalic acid may also be prepared through the reaction of the acid chloride of 4-methyl-Δ4-tetrahydrophthalic acid and the butyl alcohol.

When this procedure is employed, it has been found that the use of a third component capable of reacting to remove the liberated hydrogen chloride facilitates the preparation of the ester. Compounds which will act in this capacity without interfering with the main reaction are the amines, such as aniline, dimethyl aniline, methyl amine, ethyl amine, and ethanol amine, as well as organic bases in general, such as, for example, tetramethyl ammonium hydroxide.

In place of the alcohol, theer may be used its metallic derivative, such as the corresponding sodium, potassium, or lithium butylates.

Generally speaking, in the process described herein, the reactants may be combined in any desired proportion, the excess of either component being separated from the reaction mass at the conclusion of the reaction by distillation or other suitable means.

The reactants may be mixed at the start of the reaction, or one of the components may be added to the other component during the course of the reaction. The reaction may be carried out batchwise, semi-continuously, continuously, or otherwise and the reactants may be combined in a concurrent or countercurrent manner, or otherwise.

However, the use of approximately two mols of alcohol to one mol of the acid or the anhydride will be found to be advantageous from the standpoint of reaction speed and yield of ester.

If an acidic catalyst, such as sulfuric acid, has been employed, any acidity of the resultant product may be neutralized such as with sodium carbonate prior to separation of the ester, such as by vacuum distillation. In most cases, however, this neutralization step will be found to be unnecessary.

When mixtures containing one or more of the butyl alcohols are used for the preparation of butyl esters of 4-methyl-Δ4-tetrahydrophthalic acid, the mixture of esters so formed can be used as such, or they can be separated into their individual components by fractionation or by other suitable means. Among other methods, vacuum distillation can be used to isolate the pure butyl esters.

Illustrative of the preparation of butyl esters of 4-methyl-Δ4-tetrahydrophthalic acid by the above methods are the following examples:

*Example 2*

To a mixture of 85 parts by weight of 4-methyl-Δ4-tetrahydrophthalic anhydride dissolved in benzene, there are added 185 parts by weight of normal butyl alcohol in which has been dissolved approximately 10 parts by weight of hydrogen chloride. This mixture is refluxed at a temperature, say between 135 and 145° C. for a period of approximately 15 hours.

The water generated during the reaction is preferably continuously removed, say by collecting the condensate in a trap, separating the layers, and returning the water-free reaction materials to the reaction zone. A quantity equivalent to approximately 16 parts by weight of water is removed during the course of the reaction.

Following the extended refluxing period, the benzene and alcohol are removed, say by distillation, and the residual liquid is fractionated in vacuo.

There is thus obtained a di-normal butyl ester of 4-methyl-Δ4-tetrahydrophthalic acid in quantity equivalent to approximately 135 parts by weight, representing approximately 92% of the theoretical yield.

This ester has the following physical properties:

Boiling point, 182–184.5° C. at 7–8 mm.
Density, $d\ 20/4 = 1.007$
Refractive index, $n\ 20/D = 1.4645$

*Example 3*

A mixture comprising 85 parts by weight of 4-methyl-Δ4-tetrahydrophthalic anhydride, 185 parts by weight of normal butyl alcohol, 135 parts of benzene, and 2.5 parts of 95.5% sulfuric acid was refluxed at a temperature of approximately 140–150° C. for 45 hours.

Water was continuously removed from the condensate during the reaction in the manner described in Example 2.

After the refluxing had been discontinued, the benzene and alcohol were removed by distillation and the residue fractionated in vacuo.

There was obtained 125 parts by weight of the di-normal butyl ester of 4-methyl-Δ4-tetrahydrophthalic acid corresponding to a yield of 85% of the theoretical yield. This ester had the following properties:

Boiling point, 151.0–152.5° C. at 3–4 mm.
Density, $d\ 20/4 = 1.005$
Refractive index, $n\ 20/D = 1.4646$

*Example 4*

A mixture comprising 0.5 mol of 4-methyl-Δ4-tetrahydrophthalic anhydride, 2.5 mols of isobutyl alcohol, 46 cc. of benzene, and 2.5 grams of 96% sulfuric acid was refluxed at a temperature of approximately 145–155° C. for 24 hours.

Water was removed from the condensate, in the manner described in Example 2, continuously during the reaction.

After the refluxing had been discontinued, the benzene and alcohol were removed by distillation and the residue fractionated in vacuo.

There was obtained an 89% yield of the di-isobutyl ester of 4-methyl-Δ4-tetrahydrophthalic acid. This ester had the following properties:

Boiling point, 159–166° C. at 5–6 mm.
Refractive index, $n\ 20/D = 1.4618$–$1.4625$

*Example 5*

A mixture of 0.5 mol of 4-methyl-Δ4-tetrahydrophthalic anhydride, 2.5 mols of secondary butyl alcohol, and 46 cc. of benzene was refluxed at a temperature of approximately 145–155° C.

A continuous stream of dry hydrogen chloride was passed through the reaction mixture during the course of the reaction.

Water was removed in the manner described in Example 2, continuously during the reaction.

After refluxing had been discontinued, the benzene and alcohol were removed by distillation and the residue fractionated in vacuo. There was obtained an 85% yield of the di-secondary butyl ester of 4-methyl-Δ4-tetrahydrophthalic acid, having the following physical properties.

Boiling point, 156–163° C. at 5–7.5 mm.
Refractive index, $n\ 20/D = 1.4620$–$1.4625$
Density, $d\ 20/4 = 1.0106$

*Example 6*

A mixture of 10 grams of the powdered disodium salt of 4-methyl-Δ4-tetrahydrophthalic acid and 26 cc. of tertiary butyl chloride was heated in a sealed tube for a period of approximately 20 hours at a gradually increasing temperature in the range of 100 to 180° C.

Approximately 5 grams of the di-tertiary butyl ester of 4-methyl-Δ4-tetrahydrophthalic acid was secured. The remainder of the sodium salt of 4-methyl-Δ4-tetrahydrophthalic acid and the tertiary butyl chloride used in the reaction were recovered unchanged.

The di-tertiary butyl ester is a clear, colorless, somewhat viscous liquid. It has a boiling point of 150–170° C. at a pressure of approximately 3–5 mm. of mercury, absolute. Its refractive index ($n\ 20/D$) was 1.4905. Its molecular weight as determined by the cryoscopic method checks closely with the theoretical molecular weight.

While each example for the production of butyl esters of 4-methyl-Δ4-tetrahydrophthalic acid comprises a preferred way for producing the particular ester, it is to be understood that other ways may be employed.

My new butyl esters of 4-methyl-Δ4-tetrahydrophthalic acid may be employed for many purposes.

For example, they may be employed (1) as solvents for synthetic and natural gums, plastics, and resins; (2) as ingredients in the preparation of lacquers, spirit varnishes, oil varnishes, enamels, paints, and coating compositions generally; (3) as plasticizers for natural gums and resins such as shellac, congo, kauri, sandarac, elemi, copal, dammar, casein, and rosin; (4) as plasticizers for synthetic resins such as ester gum, cummarone resins, vinyl resins, phenol-aldehyde resins, urea-aldehyde resins, acrylate resins, methacrylate resins, polystyrene resins, and indene resins; (5) as plasticizers for cellulosic plastics such as cellulose nitrate, and cellulose acetate; and (6) as plasticizers for lacquer films.

Monobutyl esters of 4-methyl-Δ4-tetrahydrophthalic anhydride may also be prepared in accordance with my invention. As an example, they may be obtained as intermediates in the reactions in the foregoing examples by stopping the reactions before completion and separating the monobutyl and dibutyl esters by fractionation.

For convenience in the claims, the term "4-methyl-Δ4-tetrahydrophthalic acid" is intended to embrace the acid, or its anhydride, or mixtures of the same. This term also embraces other derivatives of this acid having reactive properties similar to the acid, such as, for example, the acid halide of 4-methyl-Δ4-tetrahydrophthalic acid, or its metallic derivative such as its sodium salt.

The term "maleic anhydride" likewise embraces the acid and/or its anhydride.

The term "butyl alcohol" as used in the claims is similarly to be understood as including the use of butyl alcohol derivatives, such as the corresponding halide, or metallic derivatives such as the sodium derivative.

While organic esters of particular types and procedures for the purpose of preparing such esters have been particularly described, it is to be understood that this is by way of illustration. Therefore, changes, omissions, additions, substitutions and/or modifications may be made within the scope of the claims without departing from the spirit of the invention.

I claim:

1. A butyl ester of a compound produced through the reaction of maleic anhydride and a light oil isoprene fraction.

2. A butyl ester of 4-methyl-Δ4-tetrahydrophthalic acid.

3. Di-primary-butyl ester of 4-methyl-Δ4-tetrahydrophthalic acid.

4. Di-secondary-butyl ester of 4-methyl-Δ4-tetrahydrophthalic acid.

5. Di-tertiary-butyl ester of 4-methyl-Δ4-tetrahydrophthalic acid.

6. A process for the preparation of an organic ester comprising reacting a butyl alcohol with a compound prepared through the reaction of a light oil isoprene fraction and maleic anhydride.

7. A process for the preparation of an organic ester comprising reacting 4-methyl-Δ4-tetrahydrophthalic acid with a butyl alcohol.

8. In the preparation of an organic ester derived from isoprene through the reaction of a butyl alcohol and 4-methyl-Δ4-tetrahydrophthalic acid, the step of preparing said acid comprising reacting maleic anhydride with a light oil isoprene fraction.

9. A process for the preparation of an organic ester comprising reacting 4-methyl-Δ4-tetrahydrophthalic acid with a butyl alcohol in the presence of a catalyst.

10. A process for the preparation of an organic ester comprising reacting 4-methyl-Δ4-tetrahydrophthalic acid with a butyl alcohol in the presence of benzene.

11. A cellulosic derivative plasticizer comprising a dibutyl ester of 4-methyl-Δ4-tetrahydrophthalic acid.

12. A composition comprising a cellulosic derivative and dibutyl ester of 4-methyl-Δ4-tetrahydrophthalic acid.

13. As a new compound, an organic ester corresponding to the formula:

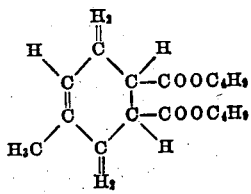

14. The reaction product of 4-methyl-Δ4-tetrahydrophthalic acid and a mixture of butyl alcohols.

FRANK J. SODAY.